C. I. E. & C. R. MASTIN.
PACKING.
APPLICATION FILED APR. 5, 1917.

1,245,003.

Patented Oct. 30, 1917.

WITNESS
Wm. O. Bell

INVENTORS
Charles L. E. Mastin,
and Charles R. Mastin.
BY
John Steward
ATTORNEY.

UNITED STATES PATENT OFFICE.

CHARLES I. E. MASTIN AND CHARLES R. MASTIN, OF HAWTHORNE, NEW JERSEY.

PACKING.

1,245,003.  Specification of Letters Patent.  Patented Oct. 30, 1917.

Original application filed March 4, 1916, Serial No. 82,088. Divided and this application filed April 5, 1917. Serial No. 159,871.

*To all whom it may concern:*

Be it known that we, CHARLES I. E. MASTIN and CHARLES R. MASTIN, citizens of the United States, residing at Hawthorne, in the county of Passaic and State of New Jersey, have invented certain new and useful Improvements in Packing, of which the following is a specification.

This invention relates to that type of gaskets, usually composed of rubber, which are subjected to pressure between the parts forming the joint to be sealed. The present application constitutes a division of our application dated March 4th, 1916, Serial No. 82,088, in which one of the novel features of the gasket therein set forth is a relatively broad low-lying table surrounding one or more of the holes in the gasket. Having such a table around the port hole of the gasket, it is explained in our said application that it is advantageous to provide means at the bolt holes of the gasket for insuring a leveling-up thereof when the bolts or other clamping means are drawn up tight, and it was proposed that such means in one form thereof might be other tables. Where the pressure of the bolts is required to be unusually heavy, it is found that the provision of mere tables at the bolt holes is not sufficient to insure the leveling-up, and it is therefore the object of our present invention to construct the gasket so that the leveling-up under such a condition will be perfectly attained. While our invention is practically applicable, however, to the bolt holes of a gasket, thus to insure leveling-up under excessive bolt pressures, it is not to be understood as limited thereto.

Our invention consists in providing an elastic gasket of the kind indicated with a relatively broad low-lying integral table extending around an opening therein and formed upon the sealing face of the gasket, and an upstanding rib extending around the opening and formed on the table; our invention further consists in such a gasket having the aforesaid table and rib formed on the table arranged specifically around a bolt hole and serving to insure leveling-up of the gasket with respect to the bolt or other clamping pressure.

Figure 1:
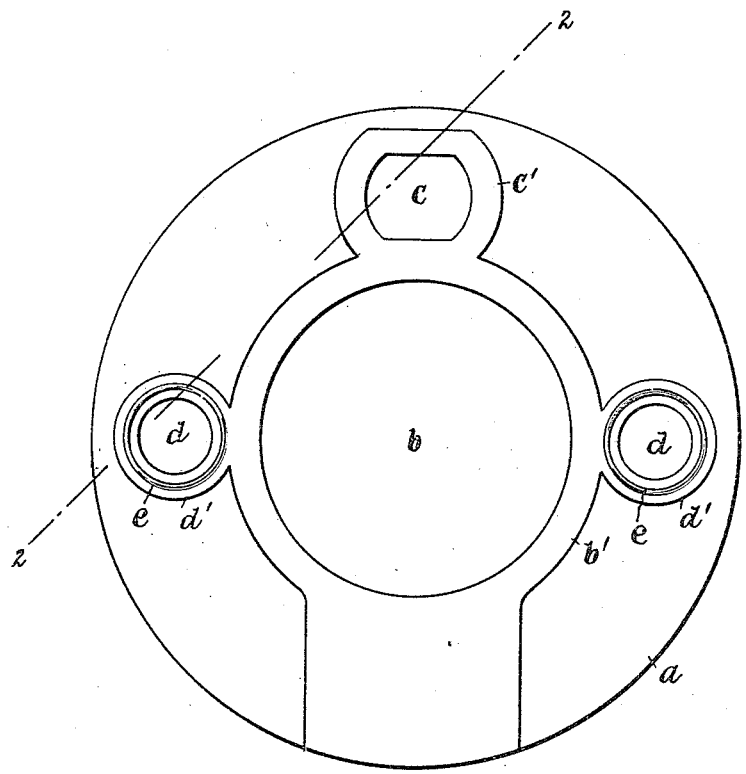
Figure 2:
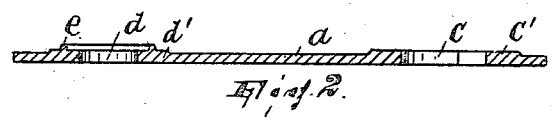

In the accompanying drawing,

Figure 1 is a plan view of the improved gasket; and,

Fig. 2 a sectional view on the line 2—2 of Fig. 1.

$a$ is the gasket composed of rubber or other elastic material and being a disk of substantially uniform thickness and formed with a large central hole $b$, a port hole $c$ and bolt holes $d$. Around the port hole $c$ one face of the gasket has built up thereon a low-lying relatively broad table $c'$.

Around each bolt hole there is formed on the same face of the gasket a low-lying relatively broad table $d'$. If desired, a broad low-lying table $b'$ may be formed around the hole $b$, so that its face will be flush with the faces of the tables $c'$ and $d'$.

Upon each table $d'$ extending around each hole $d$ is a narrow integral rib $e$. The face of the table $d'$ being in the present instance flush with that of the table $c'$ the rib $e$ stands somewhat higher than the table $c'$.

With such a construction, if the bolt pressure should be so heavy that otherwise the gasket would not be leveled-up in the joint, the ribs $e$, being higher than the table $c'$, will insure such leveling-up.

It will be understood that we have described and shown one form of our invention herein simply for illustration, what we claim being:

The hereindescribed elastic gasket adapted to be compressed between opposite joint surfaces and having an opening extending therethrough, said gasket having a relatively broad low-lying integral table extending around the said opening and formed upon the sealing face of the gasket, and an upstanding rib extending around the opening and formed on the table.

In testimony whereof we affix our signatures.

CHARLES I. E. MASTIN.
CHAS. R. MASTIN.

Copies of this patent may be obtained for five cents each, by addressing the "Commissioner of Patents, Washington, D. C."